United States Patent
Yoon et al.

(10) Patent No.: US 7,844,748 B2
(45) Date of Patent: Nov. 30, 2010

(54) METHOD AND APPARATUS FOR PRESENTING ENTITY NOT SUPPORTING UPNP AS UPNP DEVICE OR CONTENT

(75) Inventors: Hyun-sik Yoon, Seoul (KR); Kyoung-hoon Yi, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 129 days.

(21) Appl. No.: 11/540,657

(22) Filed: Oct. 2, 2006

(65) Prior Publication Data

US 2007/0079000 A1  Apr. 5, 2007

(30) Foreign Application Priority Data

Sep. 30, 2005  (KR)  ............... 10-2005-0092135

(51) Int. Cl.
*G06F 3/00* (2006.01)
*G06F 13/20* (2006.01)
*G06F 15/16* (2006.01)

(52) U.S. Cl. .................. 710/8; 710/313; 709/201; 709/250

(58) Field of Classification Search ........... None
See application file for complete search history.

(56) References Cited

U.S. PATENT DOCUMENTS

| 2002/0078161 A1* | 6/2002 | Cheng ................. 709/208 |
| 2003/0061267 A1* | 3/2003 | Dunstan .............. 709/201 |
| 2004/0133704 A1* | 7/2004 | Krzyzanowski et al. ..... 709/250 |
| 2005/0078679 A1* | 4/2005 | Henry et al. ......... 370/395.2 |

FOREIGN PATENT DOCUMENTS

| JP | 2004-334896 A | 11/2004 |
| KR | 10-2004-0045185 A | 6/2004 |
| WO | WO 03/032581 A1 | 4/2003 |
| WO | WO 2004/004221 A1 | 1/2004 |

\* cited by examiner

*Primary Examiner*—Henry W Tsai
*Assistant Examiner*—Tushar S Shah
(74) *Attorney, Agent, or Firm*—Sughrue Mion, PLLC

(57) ABSTRACT

A method and apparatus are provided for allowing a UPnP control point to recognize various entities. The method includes: generating a device description describing information on the entity in a format according to the standard using the information on the entity; and presenting a role of the device supporting the standard for a control point, which can recognize only devices supporting the standard, based on the generated device description. Accordingly, UPnP can be applied to various entities.

22 Claims, 19 Drawing Sheets

FIG. 4

| | Field | Size (octets) | Value | Description |
|---|---|---|---|---|
| Header | Application area | 1 | 1 | Independent UPnP device |
| | CRC | 2 | | Consistency checksum over Header and ToC |
| | size | 2 | | Total number of octets in the data structure |
| | version | 1 | 1 | Version number |
| Table of Content | URLBase | 126 | | Base URL for all URL in UPnP device description |
| | Friendly name | 64 | | Value of <friendlyName> of UPnP device description |
| | UDN | 68 | | Value of <UDN> of UPnP device description |
| | Manufacturer name | 64 | | The name of manufacturer |
| | Manufacturer URL | 126 | | The URL of manufacturer |
| | Model name | 32 | | Model name of this pseudo device |
| | Model number | 128 | | Model number of this pseudo device |
| | Model description | 128 | | Model description of this pseudo device |
| | Model URL | 128 | | Model URL of this pseudo device |
| | Serial number | 128 | | Serial number |
| | UPC | 12 | | Universal Product Code |
| | Icon-MimeType | 16 | | Image/+ this value is the mime type for this pseudo device |
| | Icon-width | 1 | | Width of icon |
| | Icon-height | 1 | | Height of icon |
| | Icon-color-depth | 1 | | Color depth of icon |
| | Icon-URL | 126 | | URL of Icon |
| | presentation URL | 126 | | Value of <presentationUDL> of UPnP device description. This can be URL of web page or application. |

FIG. 5

| | Field | Size (octets) | Value | Description |
|---|---|---|---|---|
| Header | Application area | 1 | 2 | Dependent UPnP device |
| | | | 4 | Dependent UPnP content |
| | CRC | 2 | | Consistency checksum over Header and ToC |
| | size | 2 | | Total number of octets in the data structure |
| | version | 1 | 1 | Version number |
| Table of Content | Adapter Server URL | 122 | | Value of URL of presenter server |

FIG. 6

```xml
<?xml version="1.0"?>
<scpd xmlns="urn:schemas-upnp-org:service-1-0" configId="1">
   <specVersion>
      <major>1</major>
      <minor>0</minor>
   </specVersion>
   <actionList>
      <action>
         <name>ExportDevice</name>
         <argumentList>
            <argument>
               <name>A_ARG_TYPE_DeviceInfo</name>
               <direction>in</direction>
               <relatedStateVariable>DeviceInfo</relatedStateVariable>
            </argument>
         </argumentList>
      </action>
      <action>
         <name>ExportContent</name>
         <argumentList>
            <argument>
               <name>A_ARG_TYPE_ContentInfo</name>
               <direction>in</direction>
               <relatedStateVariable>ContentInfo</relatedStateVariable>
            </argument>
         </argumentList>
      </action>
      <serviceStateTable>
         <stateVariable sendEvents="no">
            <name>DeviceInfo</name>
            <dataType>string</dataType>
         </stateVariable>
         <stateVariable sendEvents="no">
            <name>ContentInfo</name>
            <dataType>string</dataType>
         </stateVariable>
      </serviceStateTable>
</scpd>
```

FIG. 7

```xml
<?xml version="1.0"?>
<root xmlns="urn:schemas-upnp-org:device-1-0">
  <specVersion>
    <major>1</major>
    <minor>0</minor>
  </specVersion>
  <URLBase>URLBase VALUE </URLBase>
  <device>
    <deviceType>urn:schemas-upnp-org:device:NonNetworkedDevice:1</deviceType>
    <friendlyName> ILLUSTRATED IN FIG. 4Friendly_name</friendlyName>
    <manufacturer> ILLUSTRATED IN FIG. 4 manufacturer_name</manufacturer>
    <manufacturerURL> ILLUSTRATED IN FIG. 4manufacturer_site</manufacturerURL>
    <modelDescription> ILLUSTRATED IN FIG. 4 model_description</modelDescription>
    <modelName> ILLUSTRATED IN FIG. 4model_name</modelName>
    <modelNumber> ILLUSTRATED IN FIG. 4model_number</modelNumber>
    <modelURL>ILLUSTRATED IN FIG. 4model_URL </modelURL>
    <serialNumber> ILLUSTRATED IN FIG. 4serial_number</serialNumber>
    <UDN> UDN VALUE</UDN>
    <UPC> ILLUSTRATED IN FIG. 4 UPC VALUE</UPC>
    <iconList>
      <icon>
        <mimetype> ILLUSTRATED IN FIG. 4Icon-MimeType VALUE</mimetype>
        <width>ILLUSTRATED IN FIG. 4icon-width</width>
        <height> ILLUSTRATED IN FIG. 4icon-height</height>
        <depth> ILLUSTRATED IN FIG. 4icon-color-depth</depth>
        <url> ILLUSTRATED IN FIG. 4icon-URL</url>
      </icon>
    </iconList>
    <presentationURL>ILLUSTRATED IN FIG. 4presentation_URL</presentationURL>
  </device>
</root>
```

FIG. 8

```
NOTIFY * HTTP/1.1
HOST: 239.255.255.250:1900
CACHE-CONTROL: max-age = 5
LOCATION: URL of UpnP device description
NT: upnp:rootdevice
NTS: ssdp:alive
SERVER: OS/version UPnP/1.0 product/version
USN: uuid:device-UUID::upnp:rootdevice
```

FIG. 10

| | Field | Size (octets) | Value | Description |
|---|---|---|---|---|
| Header | Application area | 1 | 3 | Independent UPnP content |
| | CRC | 2 | | Consistency checksum over Header and ToC |
| | size | 2 | | Total number of octets in the data structure |
| | version | 1 | 1 | Version number |
| Table of Content | dc:title | 256 | | Title of content |
| | upnp:class | 256 | | Class of content |
| | res count | 1 | | The number of <res> elements |
| | res@protocolInfo | 256 | | protofolInfo specified in UPnP AV specification |
| | resUrl | 256 | | URL of the content. This can be URL of existing media file, web page, or application. |
| | res@importUrl | 256 | | res@importUrl which will be imported later |
| | Adapter Server URL | 256 | | Value of URL of presenter server |

FIG. 11

| | Field | Size (octets) | Value | Description |
|---|---|---|---|---|
| Header | Application area | 1 | 4 | Dependent UPnP content |
| | CRC | 2 | | Consistency checksum over Header and ToC |
| | size | 2 | | Total number of octets in the data structure |
| | version | 1 | 1 | Version number |
| Table of Content | Adapter Server URL | 122 | | Value of URL of presenter server |

FIG. 12

```
<DIDL-Lite xmlns:dc="http://purl.org/dc/elements/1.1/"
           xmlns:upnp=" urn:schemas-upnp-org:metadata-1-0/upnp/"
           xmlns=" urn:schemas-upnp-org:metadata-1-0/DIDL-Lite" >
    <item id="" restricted="false">
         <dc:title> ILLUSTRATED IN FIG. 10 dc:title</dc:title>
         <upnp:class> ILLUSTRATED IN FIG. 10 upnp:class</upnp:class>
         <res protocolInfo="ILLUSTRATED IN FIG. 10 res@protocolInfo">
              ILLUSTRATED IN FIG. 10 resUrl
         </res>
    </item>
</DIDL-Lite>
```

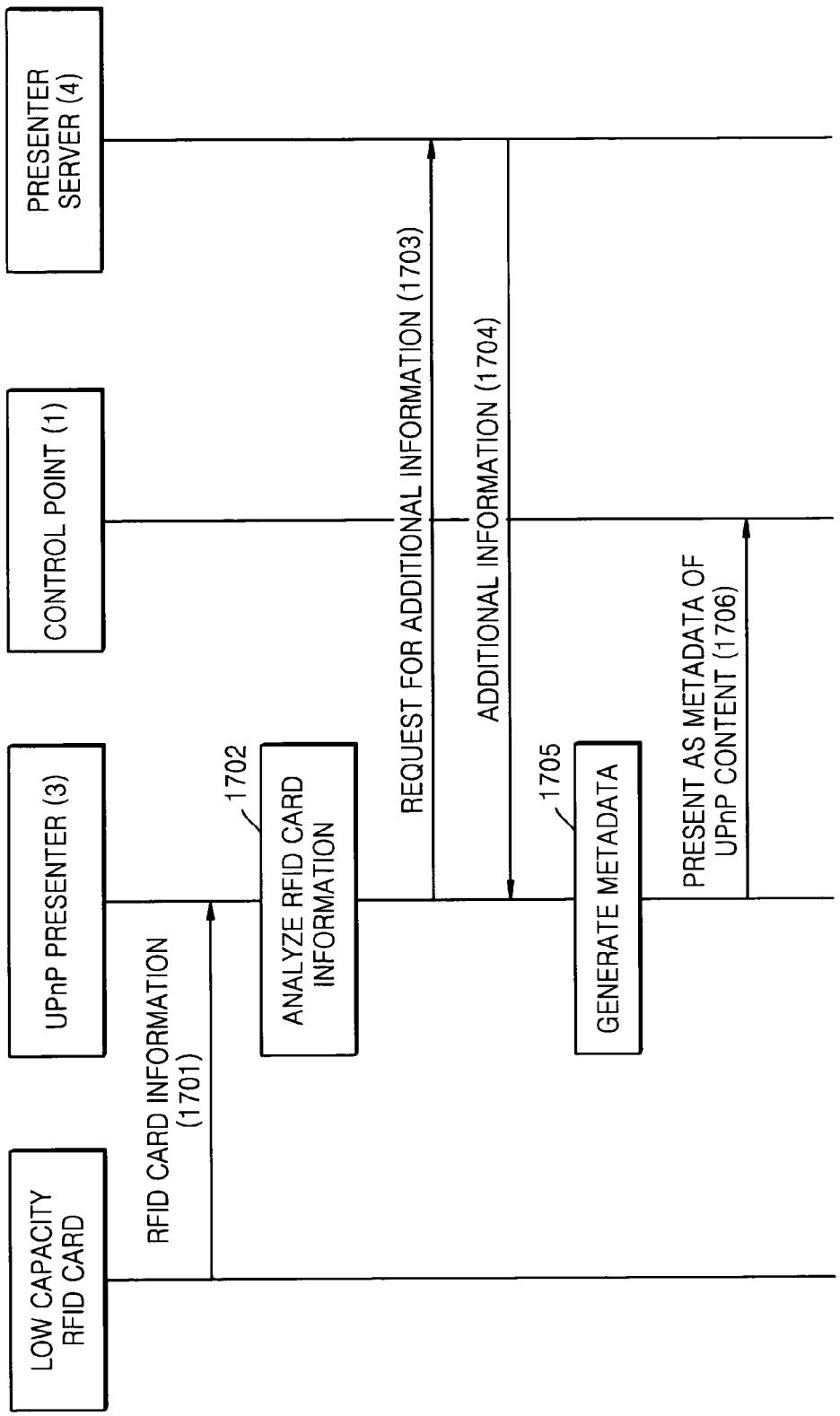

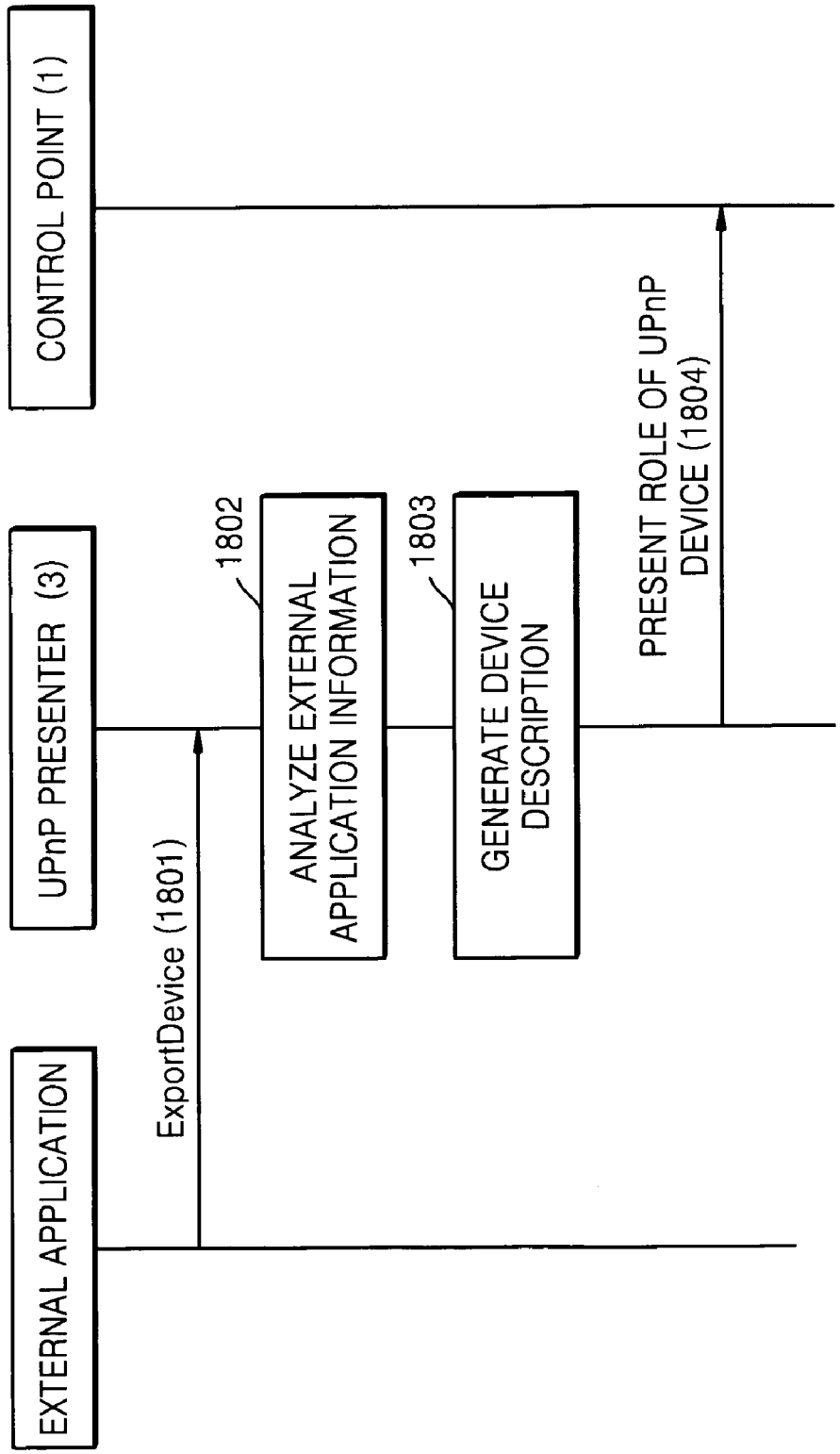

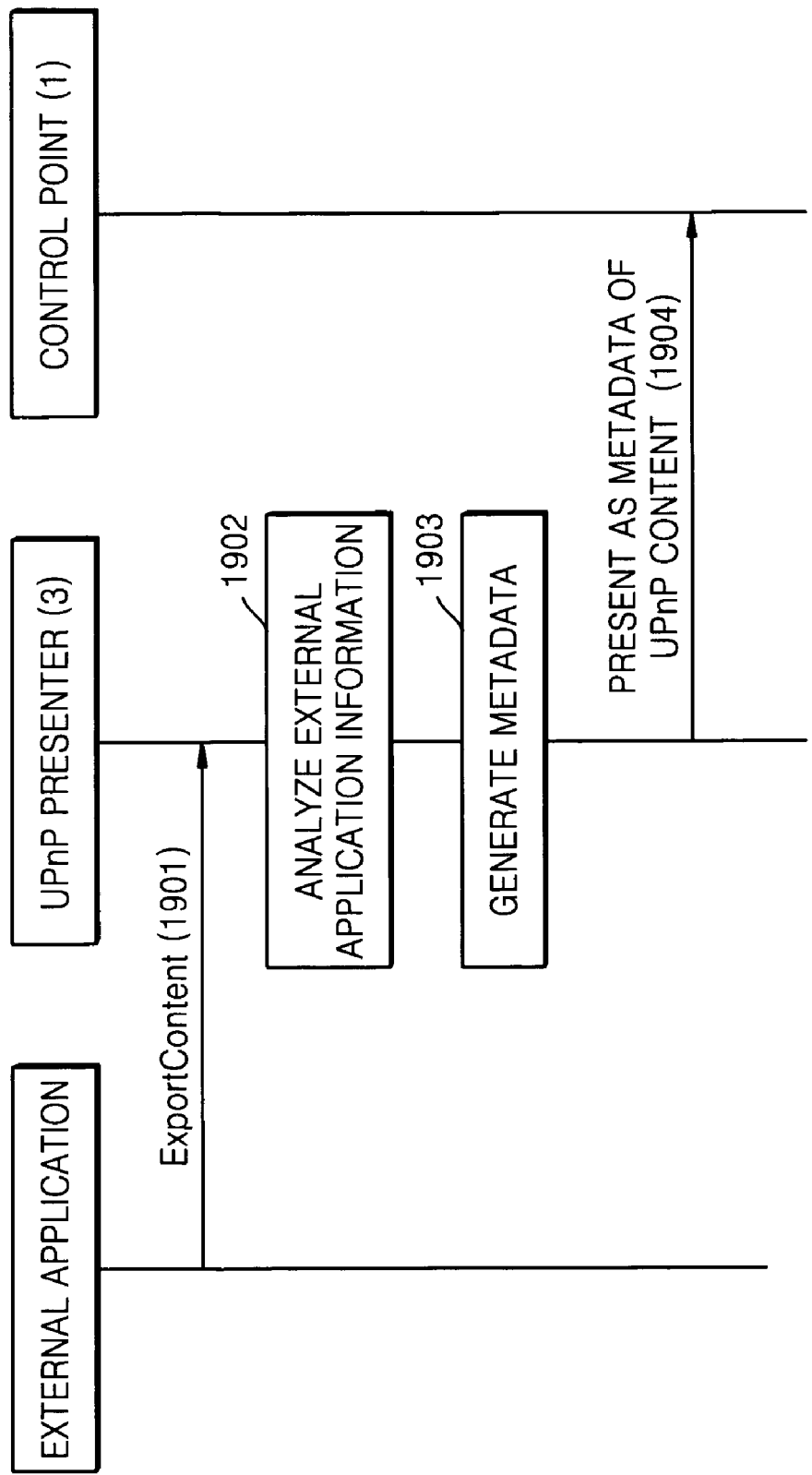

METHOD AND APPARATUS FOR PRESENTING ENTITY NOT SUPPORTING UPNP AS UPNP DEVICE OR CONTENT

CROSS-REFERENCE TO RELATED PATENT APPLICATION

This application claims priority from Korean Patent Application No. 10-2005-0092135, filed on Sep. 30, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to allowing a Universal Plug and Play (UPnP) control point to recognize various entities, and more particularly, to a method of recognizing a UPnP device or UPnP content detected by a UPnP control point in a UPnP network even when the UPnP device or UPnP content is not a physical device or content, to an architecture and description of a device for showing the UPnP device or UPnP content in the UPnP network, and to a configuration and method for presenting the UPnP device or UPnP content.

2. Description of the Related Art

Since a personal computer (PC) can automatically recognize peripherals using a Plug and Play function, a user can easily install peripherals. UPnP is a technique of extending the Plug and Play function all over a network and allows devices, such as PCs, peripherals, and home appliances, to automatically recognize each other when they are connected to the network.

FIG. 1 is a block diagram of a related art UPnP network system.

Referring to FIG. 1, the UPnP network system includes a control point 11 and UPnP devices 12 and 13. In particular, UPnP devices 12 and 13 can be a media server and a media renderer, respectively.

The control point 11 recognizes UPnP devices existing in a network and controls the recognized UPnP devices.

The media server 12 provides UPnP content. The media server 12 may be a media server providing media content. In particular, the media server 12 must provide a content directory service and a connection manager service. The content directory service allows the control point 11 to discover information on UPnP content which a UPnP device has. The connection manager service is used to enumerate and select a transmission protocol and data format for transmitting UPnP content.

The media renderer 13 renders UPnP content provided by the media server 12 according to UPnP. The media renderer 13 may be a digital TV reproducing media content. In particular, the media renderer 13 must provide a rendering control service and the connection manager service. The rendering control service allows the control point 11 to control various rendering capabilities of a UPnP device.

A UPnP device is recognized by the control point 11 as follows. The UPnP device transmits an advertisement message to the control point 11. The control point 11 recognizes the UPnP device by obtaining a specification of the UPnP device from the UPnP device.

In another way, a UPnP device is recognized by the control point 11 as follows. The content directory service provided by the media server 12 generates metadata of UPnP content. The control point 11 recognizes the UPnP content by obtaining the metadata of the UPnP content through a browse( ) action or a search( ) action of the content directory service.

Related art UPnP defines configurations of UPnP devices, a configuration of UPnP content, and a protocol between the UPnP devices and a control point, wherein a UPnP standard is prescribed based on the stereotype that the UPnP devices are physical devices, such as a media server and home appliances, e.g., a digital TV, and that the UPnP content is classical content such as media content. However, by classifying the objects into UPnP devices or UPnP content, the type of objects which can be accessible on a network according to UPnP is limited, thereby contravening the generality aimed for by UPnP.

SUMMARY OF THE INVENTION

The present invention provides a method and apparatus for applying UPnP to various entities by excluding the assumption that a UPnP device is a physical device, such as a media server or a digital TV, and that UPnP content is AV content such as media content.

The present invention also provides a computer readable recording medium storing a computer readable program for executing the method.

According to an aspect of the present invention, there is provided a method of presenting an entity which does not support a predetermined standard as a device supporting the predetermined standard, the method comprising: generating a device description describing information on the entity in a format according to the predetermined standard using the information on the entity; and presenting a role of the device supporting the predetermined standard for a control point, which can recognize only devices supporting the predetermined standard, based on the generated device description.

According to another aspect of the present invention, there is provided an apparatus for presenting an entity which does not support a predetermined standard as a device supporting the predetermined standard, the apparatus comprising: a generation unit generating a device description describing information on the entity in a format according to the predetermined standard using the information on the entity; and a presenter presenting a role of the device supporting the predetermined standard for a control point, which can recognize only devices supporting the predetermined standard, based on the generated device description.

According to another aspect of the present invention, there is provided a computer readable recording medium storing a computer readable program for executing the method of presenting an entity which does not support a predetermined standard as a device supporting the predetermined standard.

According to an aspect of the present invention, there is provided a method of presenting an entity which does not support a predetermined standard as content supporting the predetermined standard, the method comprising: generating metadata describing information on the entity in a format according to the predetermined standard using the information on the entity; and presenting the generated metadata as metadata of the content supporting the predetermined standard for a control point, which can recognize only content supporting the predetermined standard.

According to another aspect of the present invention, there is provided an apparatus for presenting an entity which does not support a predetermined standard as content supporting the predetermined standard, the apparatus comprising: a generation unit generating metadata describing information on the entity in a format according to the predetermined standard using the information on the entity; and a presenter presenting the metadata generated by the generation unit as metadata of the content supporting the predetermined standard for a control point, which can recognize only content supporting the predetermined standard.

According to another aspect of the present invention, there is provided a computer readable recording medium storing a computer readable program for executing the method of presenting an entity which does not support a predetermined standard as content supporting the predetermined standard.

BRIEF DESCRIPTION OF THE DRAWINGS

The above and other aspects of the present invention will become more apparent by describing in detail exemplary embodiments thereof with reference to the attached drawings in which:

FIG. 4 is a structure of information on a high capacity RFID card to be presented as a UPnP device, according to an exemplary embodiment of the present invention;

FIG. 5 is a structure of information on a low capacity RFID card to be presented as a UPnP device, according to an exemplary embodiment of the present invention;

FIG. 6 illustrates a description of a UPnP service according to an exemplary embodiment of the present invention;

FIG. 7 illustrates a description of a UPnP device according to an exemplary embodiment of the present invention;

FIG. 8 illustrates an advertisement message according to an exemplary embodiment of the present invention;

FIG. 10 is a structure of information on a high capacity RFID card to be presented as UPnP content, according to an exemplary embodiment of the present invention;

FIG. 11 is a structure of information on a low capacity RFID card to be presented as UPnP content, according to an exemplary embodiment of the present invention;

FIG. 12 illustrates metadata according to an exemplary embodiment of the present invention;

FIG. 17 is a flowchart of a method of presenting a low capacity RFID card as UPnP content according to an exemplary embodiment of the present invention;

FIG. 18 is a flowchart of a method of presenting an external application as a UPnP device according to an exemplary embodiment of the present invention; and FIG. 19 is a flowchart of a method of presenting an external application as UPnP content according to an exemplary embodiment of the present invention.

DETAILED DESCRIPTION OF EXEMPLARY EMBODIMENTS THE INVENTION

The present invention will now be described more fully with reference to the accompanying drawings, in which exemplary embodiments of the invention are shown.

Figure 1:
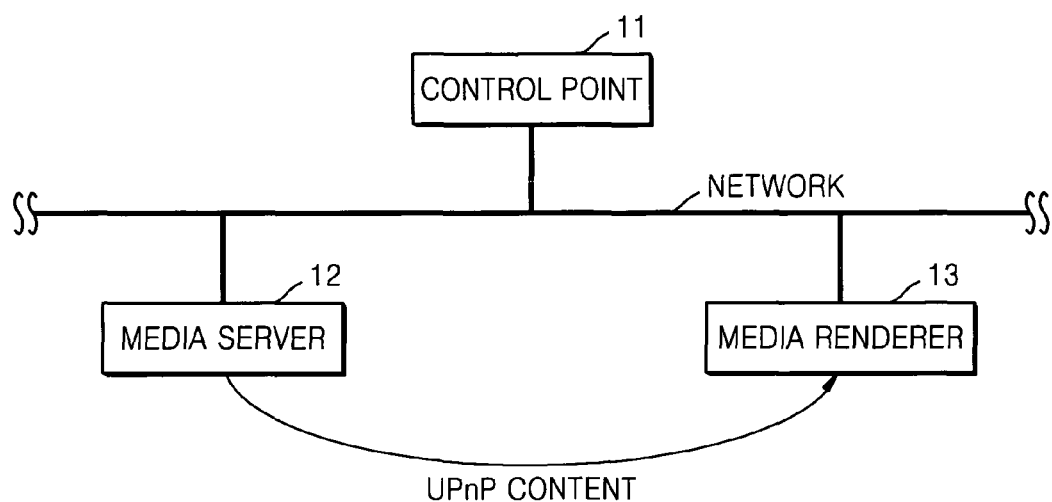
FIG. 1 is a block diagram of a related art UPnP network system.
Figure 2:
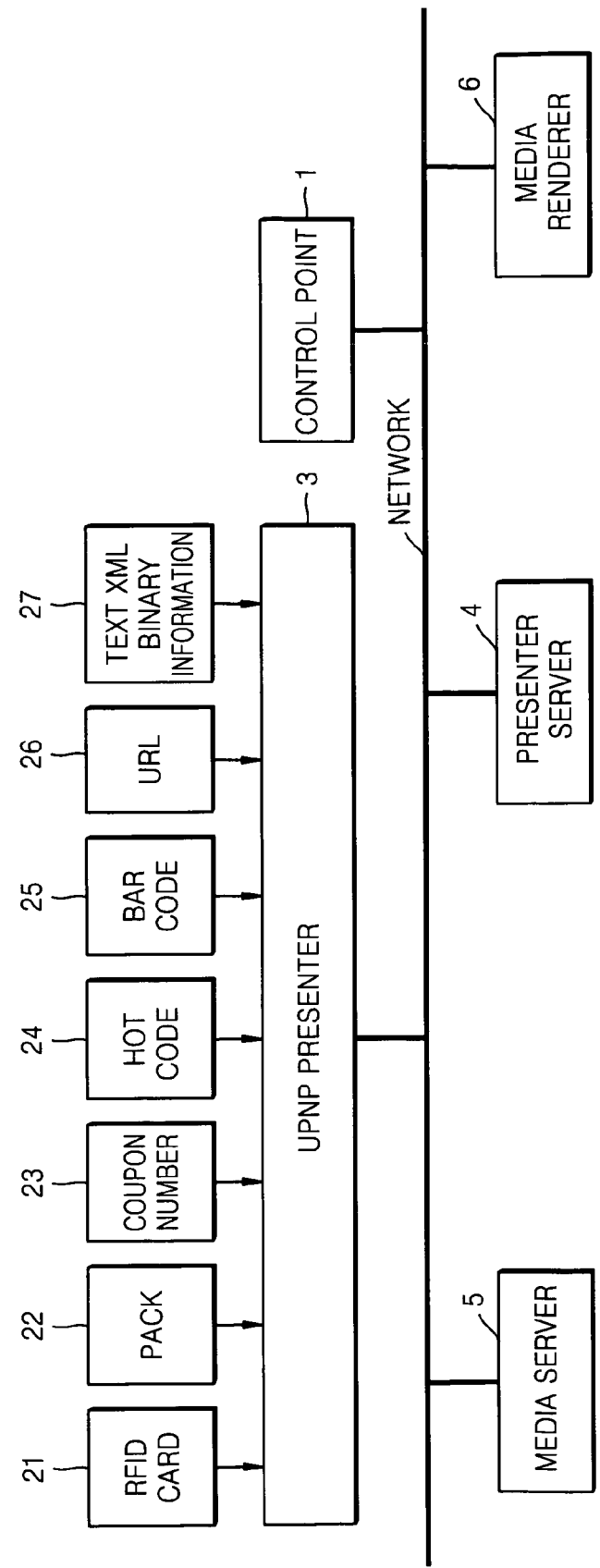
FIG. 2 is a block diagram of a UPnP network system according to an exemplary embodiment of the present invention.

FIG. 2 is a block diagram of a UPnP network system according to an exemplary embodiment of the present invention.

Referring to FIG. 2, the UPnP network system includes a control point 1, at least one entity which does not support UPnP (i.e., entities 21 through 27 which do not support UPnP), a UPnP presenter 3, a presenter server 4, a media server 5, and a media renderer 6.

The control point 1 recognizes UPnP devices existing in a network and controls the recognized UPnP devices.

The entities 21 through 27 which do not support UPnP are entities which the control point 1 cannot recognize as a UPnP device or UPnP content, for example, an RFID card 21, a pack 22, a coupon number 23, a hot code 24, a barcode 25, a Uniform Resource Locator (URL) 26, and text XML binary information 27.

The UPnP presenter 3 presents an entity which does not support UPnP as a UPnP device or UPnP content.

The presenter server 4 provides additional information required in a process in which an entity which does not support UPnP is presented as a UPnP device or UPnP content by the UPnP presenter 3. As described above, most entities which do not support UPnP do not have a data storage capability, or even if they have, they have low data storage capacity. The presenter server 4 exists to cover the data storage capability of the entities which do not support UPnP.

The media server 5 provides UPnP content. According to UPnP, the media server 5 must provide the content directory service and the connection manager service. The content directory service allows the control point 1 to discover information on UPnP content which a UPnP device has. The connection manager service is used to enumerate and select a transmission protocol and data format for transmitting UPnP content.

The media renderer 6 renders UPnP content provided by the media server 5 according to UPnP. According to UPnP, the media renderer 6 must provide the rendering control service and the connection manager service. The rendering control service allows the control point 1 to control various rendering capabilities of a UPnP device.

Figure 3:
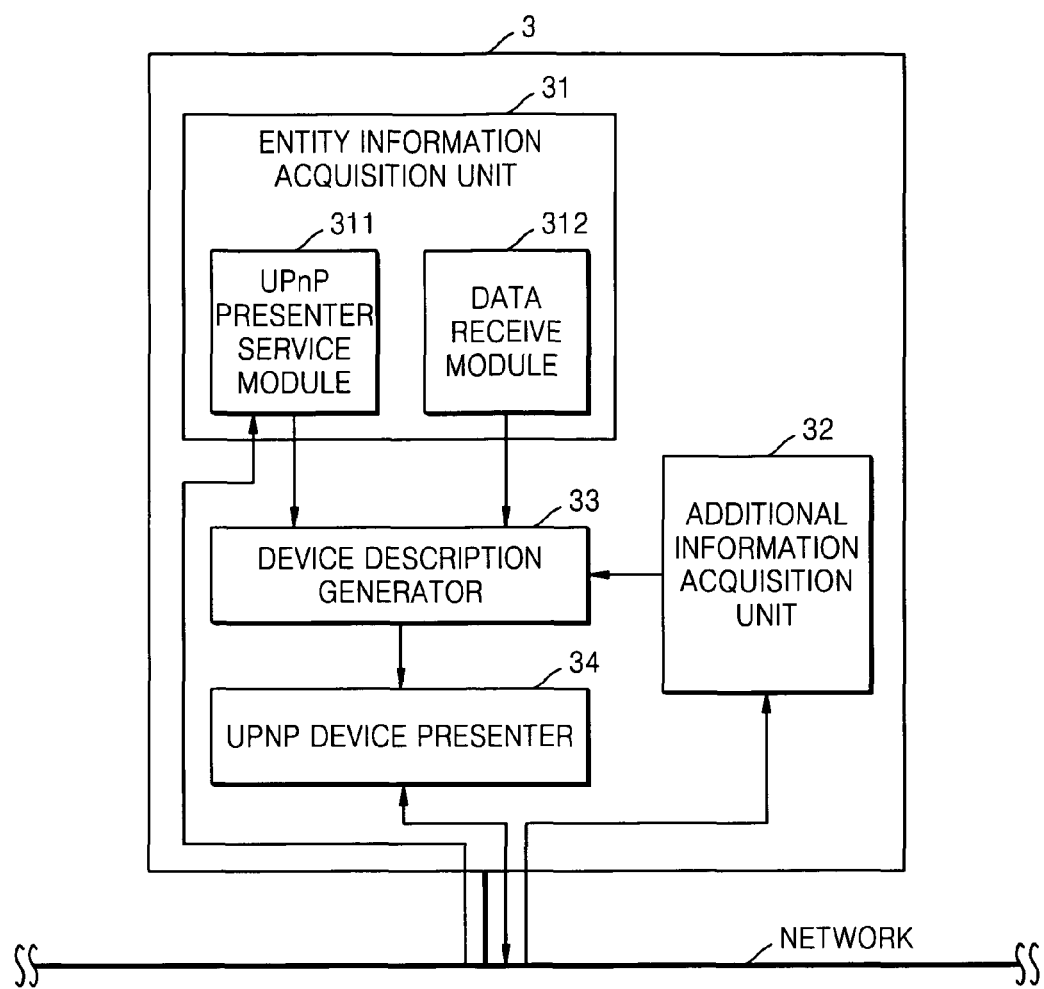
FIG. 3 is a block diagram of a UPnP presenter according to an exemplary embodiment of the present invention.

FIG. 3 is a block diagram of the UPnP presenter 3 according to an exemplary embodiment of the present invention.

Referring to FIG. 3, the UPnP presenter 3 includes an entity information acquisition unit 3 1, an additional information acquisition unit 32, a device description generator 33, and a UPnP device presenter 34. In particular, unlike a configuration of the UPnP presenter 3 illustrated in FIG. 9, the UPnP presenter 3 illustrated in FIG. 3 has a configuration to present an entity which does not support UPnP as a UPnP device.

The entity information acquisition unit 31 obtains information on an entity which does not support UPnP to be presented as a UPnP device. As an example, information on an RFID card, which can store bulk data, among entities which do not support UPnP will now be described in detail. In general, a high capacity RFID card is an active RFID card.

FIG. 4 is a structure of information on a high capacity RFID card to be presented as a UPnP device, according to an exemplary embodiment of the present invention.

Referring to FIG. 4, the information on a high capacity RFID card to be presented as a UPnP device is largely divided into a header part and a content table part, each of the header part and the content table part including a plurality of fields. The structure of the information on a high capacity RFID card to be presented as a UPnP device illustrated in FIG. 4 is only an example and can be constructed in any format only if information required to generate a UPnP device description is included.

As another example, information on an RFID card, which can store short data, among entities which do not support UPnP will now be described in detail. In general, a low capacity RFID card is a passive RFID card.

FIG. 5 is a structure of information on a low capacity RFID card to be presented as a UPnP device, according to an exemplary embodiment of the present invention.

Referring to FIG. 5, the information on a low capacity RFID card to be presented as a UPnP device is largely divided into a header part and a content table part, the header part including a plurality of fields. The content table part includes a single field because of the limitation of storage capacity of the low capacity RFID card. In this single field, a URL value of the presenter server 4 is recorded. The presenter server 4 possesses information on the content table part. The structure of the information on a low capacity RFID card to be presented as a UPnP device illustrated in FIG. 5 is only an example and can be constructed in any format only if information required to generate a UPnP device description is included.

The entity information acquisition unit 31 includes a UPnP presenter service module 311 and a data receive module 312. The UPnP presenter service module 311 obtains the information on an entity which does not support UPnP to be presented as a UPnP device by receiving and analyzing information on an entity which does not support UPnP via the network using a UPnP service allowing the UPnP presenter 3 to obtain the information on the entity which does not support UPnP by controlling devices in the network. The UPnP service is different from a related art UPnP service and is newly defined according to an exemplary embodiment of the present invention. In more detail, the UPnP presenter service module 311 obtains the information on an entity which does not support UPnP by setting a type of the UPnP service to "urn:schemas-upnp-org:service:UpnPPresenter:1" and setting a description of the UPnP service as illustrated in FIG. 6.

FIG. 6 illustrates a description of the UPnP service according to an exemplary embodiment of the present invention. In particular, "ExportDevice" and "ExportContent" in the description of the UPnP service illustrated in FIG. 6 are newly defined actions in the current exemplary embodiment. "ExportDevice" recognizes information transferred as a parameter A_ARG_TYPE_DeviceInfo and exports this information as a UPnP device. "ExportContent" is used when an entity which does not support UPnP is presented as UPnP content, which will be described later.

The data receive module 312 obtains the information on an entity which does not support UPnP to be presented as a UPnP device by receiving and analyzing information on an entity which does not support UPnP via various data readers without the network. The various data readers are devices reading information on an entity which does not support UPnP from the entity, e.g., an RFID reader, a smart card reader, a keyboard, a mouse, a barcode reader, a hot code reader, a pack reader, a Compact Disk (CD) drive, and a Digital Versatile Disc (DVD) drive.

The additional information acquisition unit 32 obtains additional information from the presenter server 4 by accessing the presenter server 4 existing in the network when the additional information is required besides the information obtained by the entity information acquisition unit 31. For the low capacity RFID card, the additional information is information on the content table part. However, since the additional information is not required for the high capacity RFID card, the additional information acquisition unit 32 does not have to obtain the additional information.

The device description generator 33 generates a device description describing the information on an entity which does not support UPnP in a format according to UPnP, using the information obtained by the entity information acquisition unit 31 or the information obtained by the entity information acquisition unit 31 and the additional information acquisition unit 32. When the entity is the high capacity RFID card, the device description generator 33 generates a device description using only the information obtained by the entity information acquisition unit 31. When the entity is the low capacity RFID card, the device description generator 33 generates a device description using the information obtained by the entity information acquisition unit 31 and the additional information acquisition unit 32.

FIG. 7 illustrates a device description according to an exemplary embodiment of the present invention.

Referring to FIG. 7, the device description is generated in an XML format according to UPnP using the information on the high capacity RFID card illustrated in FIG. 4. Most items of the device description are set by the information obtained by the entity information acquisition unit 31 or the information obtained by the entity information acquisition unit 31 and the additional information acquisition unit 32. However, items <URLBase>, <deviceType>, and <UDN> are set by the device description generator 33.

In particular, a URL assigned by an entity which does not support UPnP is described in <presentation URL> of the device description, and the control point 1 or other device assigned by the control point 1, e.g., the media renderer 5, accesses the URL. This URL may be a URL of a web page or an execution file. If the URL is a URL of a web page, the control point 1 outputs the web page by accessing the URL, and a user performs navigation according to a link of the output web page.

For example, if coupon information is stored in an RFID card presented as a UPnP device by the UPnP presenter 3, a URL of a web page providing the coupon information is recorded in <presentation URL> of the device description illustrated in FIG. 7. In this case, the control point 1 outputs the web page providing the coupon information by accessing the URL, and the user performs navigation according to a link of the output web page.

The UPnP device presenter 34 presents a role of a UPnP device for the control point 1, which can recognize only UPnP devices among arbitrary devices, based on the device description generated by the device description generator 33. In more detail, the UPnP device presenter 34 notifies the control point I that the device description is generated and presents a role of a UPnP device by exporting the device description in response to a request of the control point 1 receiving this notification. That is, the UPnP device presenter 34 multicasts an advertisement message including a URL by which the device description can be obtained, i.e., a URL of the UPnP presenter 3, to the control point 1, and then the control point 1, which has received the advertisement message, obtains the device description from the URL of the UPnP presenter 3.

FIG. 8 illustrates an advertisement message according to an exemplary embodiment of the present invention.

Referring to FIG. 8, the advertisement message is edited in an HTTP document format according to UPnP using information on a location possessing the device description generated by the device description generator 33. In particular, a URL of the device description, i.e., a URL of the location possessing the device description, is recorded in a LOCATION item of the advertisement message illustrated in FIG. 8. In general, the URL of the UPnP presenter 3, which has generated the device description, is recorded.

The UPnP device presenter 34 also presents a role of a UPnP device by performing a response operation in response to a control operation performed by the control point 1 which has obtained the device description according to the export. That is, the UPnP device presenter 34 performs operations described below after an entity which does not support UPnP is recognized as a device supporting UPnP by the control point 1. The UPnP device presenter 34 generates a description of a UPnP service, which is a control unit for processing a specific job between devices existing in the network, in response to a control operation performed by the control point 1, provides through a device description a URL by which the service description can be obtained, provides a URL by which an action of the UPnP service can be called, processes the action call, and notifies of a state change of the UPnP service.

However, the information on an entity which does not support UPnP must include information required to generate the UPnP service description, e.g., a service name, a service control URL, an action name, an action parameter, and a state variable. The information on an entity which does not support UPnP also must include a description regarding a processing way of the action call of the UPnP service. For example, a description regarding a processing way such as "a specific web service is called in response to an action call of a UPnP service" must be included.

Figure 9:
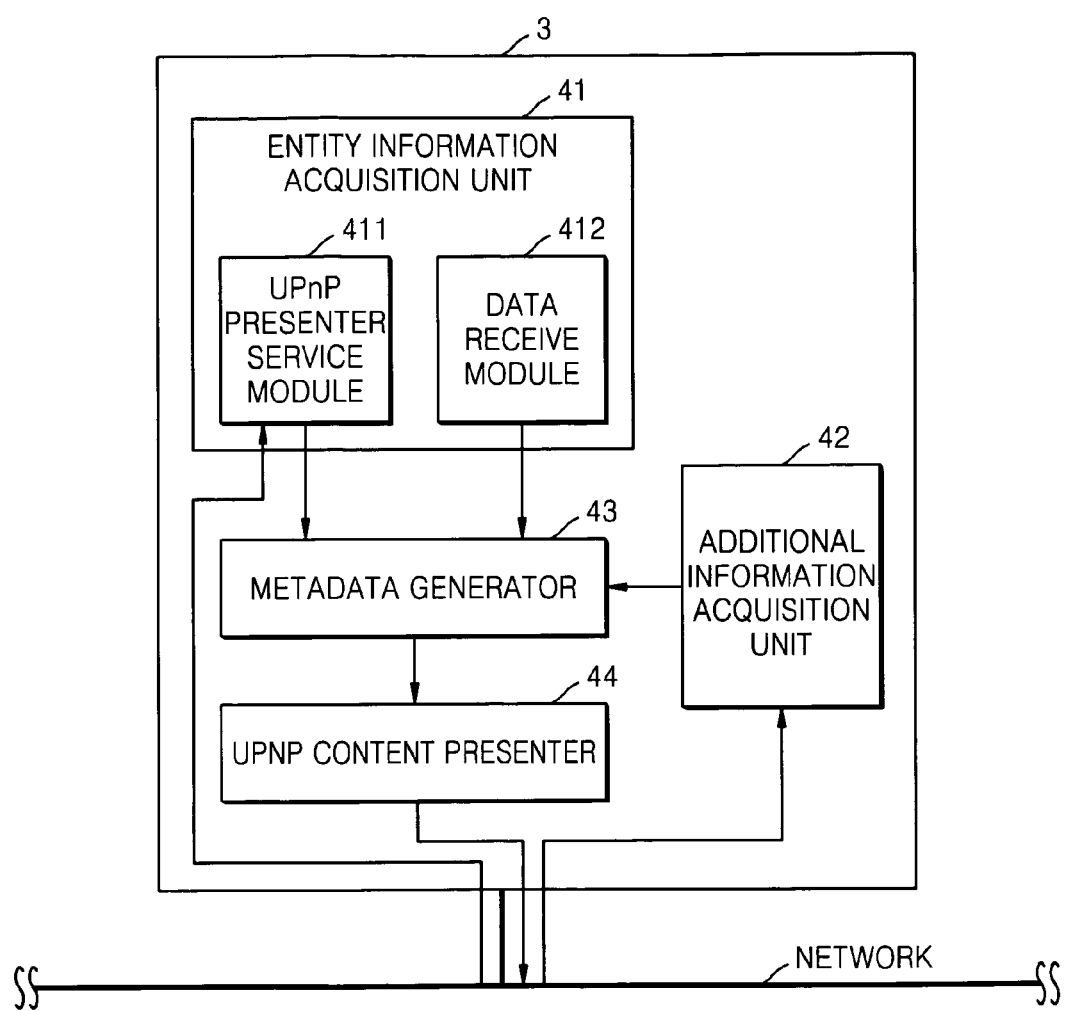
FIG. 9 is a block diagram of a UPnP presenter according to another exemplary embodiment of the present invention.

FIG. 9 is a block diagram of the UPnP presenter 3 according to another exemplary embodiment of the present invention.

Referring to FIG. 9, the UPnP presenter 3 includes an entity information acquisition unit 41, an additional information acquisition unit 42, a metadata generator 43, and a UPnP content presenter 44. In particular, unlike the configuration of the UPnP presenter 3 illustrated in FIG. 3, the UPnP presenter 3 illustrated in FIG. 9 has a configuration to present an entity which does not support UPnP as UPnP content.

The entity information acquisition unit 41 obtains information on an entity which does not support UPnP to be presented as UPnP content. As an example, information on an RFID card, which can store bulk data, among entities which do not support UPnP will now be described in detail.

FIG. 10 illustrates a structure of information on a high capacity RFID card to be presented as UPnP content, according to an exemplary embodiment of the present invention.

Referring to FIG. 10, the information on a high capacity RFID card to be presented as UPnP content is largely divided into a header part and a content table part, each of the header part and the content table part including a plurality of fields. The structure of the information on a high capacity RFID card illustrated in FIG. 10 is only an example and can be constructed in any format only if information required to generate UPnP metadata is included.

As another example, information on an RFID card, which can store short data, among entities which do not support UPnP will now be described in detail.

FIG. 11 is a structure of information on a low capacity RFID card to be presented as UPnP content, according to an exemplary embodiment of the present invention.

Referring to FIG. 11, the information on a low capacity RFID card to be presented as UPnP content is largely divided into a header part and a content table part, the header part including a plurality of fields. The content table part includes a single field because of the limitation of storage capacity of the low capacity RFID card. In this field, a URL value of the presenter server 4 is recorded. The presenter server 4 possesses information on the content table part. The structure of the information on a low capacity RFID card illustrated in FIG. 11 is only an example and can be constructed in any format only if information required to generate UPnP metadata is included.

The entity information acquisition unit 41 includes a UPnP presenter service module 411 and a data receive module 412. The UPnP presenter service module 411 obtains the information on an entity which does not support UPnP to be presented as UPnP content by receiving and analyzing information on an entity which does not support UPnP via the network using a UPnP service allowing the UPnP presenter 3 to obtain the information on the entity which does not support UPnP by controlling devices in the network. The UPnP service is different from a related art UPnP service and is newly defined according to an exemplary embodiment of the present invention. In more detail, the UPnP presenter service module 411 obtains the information on an entity which does not support UPnP by setting a type of the UPnP service to "urn:schemas-upnp-org:service:UpnPPresenter:1" and setting a description of the UPnP service as illustrated in FIG. 6.

In particular, "ExportContent" in the description of the UPnP service illustrated in FIG. 6 recognizes information transferred as a parameter A_ARG_TYPE_ContentInfo and exports this information as UPnP content, The data receive module 412 obtains the information on an entity which does not support UPnP to be presented as UPnP content by receiving and analyzing information on an entity which does not support UPnP via various data readers without the network. The various data readers are devices reading information on an entity which does not support UPnP from the entity.

The additional information acquisition unit 42 obtains additional information from the presenter server 4 by accessing the presenter server 4 existing in the network when the additional information is required besides the information obtained by the entity information acquisition unit 41. For the low capacity RFID card, the additional information is information on the content table part.

The metadata generator 43 generates metadata describing the information on an entity which does not support UPnP in a format according to UPnP using the information obtained by the entity information acquisition unit 41 or the information obtained by the entity information acquisition unit 41 and the additional information acquisition unit 42. When the entity is the high capacity RFID card, the metadata generator 43 generates metadata using only the information obtained by the entity information acquisition unit 41. When the entity is the low capacity RFID card, the metadata generator 43 generates metadata using the information obtained by the entity information acquisition unit 41 and the additional information acquisition unit 42.

FIG. 12 illustrates metadata according to an exemplary embodiment of the present invention.

Referring to FIG. 12, the metadata is generated in an XML format according to UPnP using the information on the high capacity RFID card illustrated in FIG. 10. Most items of the metadata are set by the information obtained by the entity information acquisition unit 41 or the information obtained by the entity information acquisition unit 41 and the additional information acquisition unit 42.

In particular, a URL assigned by an entity which does not support UPnP is described in <res> of the metadata, and the control point 1 or other device assigned by the control point 1, e.g., the media renderer 5, accesses the URL. This URL may be a URL of a web page or an execution file. If the URL is a URL of a web page, the control point 1 outputs the web page by accessing the URL, and a user performs navigation according to a link of the output web page.

For example, if coupon information is stored in an RFID card presented as UPnP content by the UPnP presenter 3, a URL of a web page providing the coupon information is recorded in <res> of the metadata illustrated in FIG. 12. In this case, the control point 1 outputs the web page providing the coupon information by accessing the URL, and the user performs navigation according to a link of the output web page.

The UPnP content presenter 44 presents the metadata generated by the metadata generator 43 as metadata of UPnP content for the control point 1, which can recognize only UPnP content among arbitrary content. In more detail, when the UPnP content presenter 44 has a UPnP content directory service therein, the UPnP content presenter 44 notifies the control point 1 that the metadata is generated and presents the metadata as UPnP content by exporting the metadata using state variable parameters of the UPnP content directory service, i.e., SystemUpdateID and ContainerUpdateID, in response to a request of the control point 1, which has received this notification.

When the UPnP content presenter 44 does not have the UPnP content directory service and wants to export the metadata to the control point 1 via the media server 5 having the UPnP content directory service, the UPnP content presenter 44 presents the metadata as UPnP content by exporting the metadata to the media server 5 through CreateObject( ) and ExportObject( ) actions provided by the UPnP content directory service of the media server 5.

Figure 13:
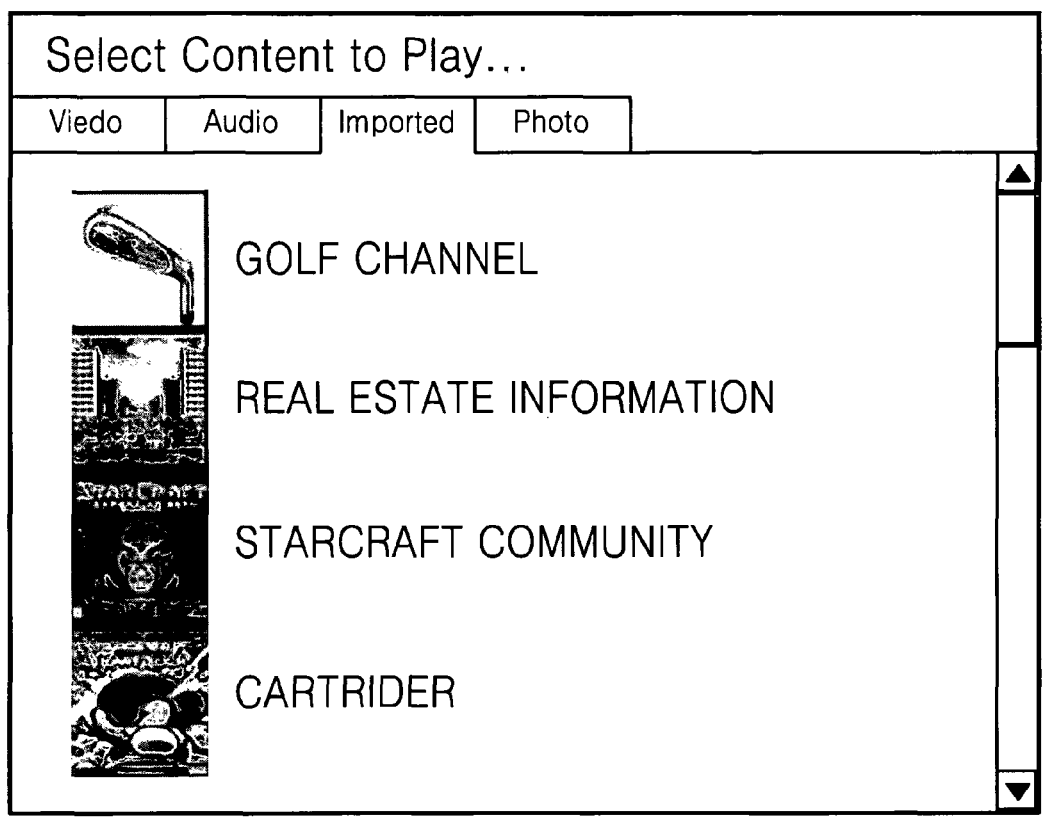
FIG. 13 illustrates an image output by a control point, according to an exemplary embodiment of the present invention.

FIG. 13 illustrates an image output by the control point 1, according to an exemplary embodiment of the present invention. That is, the image illustrated in FIG. 13 is output by the control point 1, which has recognized entities presented as UPnP devices or UPnP content by the UPnP presenter 3.

Referring to FIG. 13, the image output by the control point 1 includes 4 kinds of content, the first content obtained by importing user's golf channel information, the second content obtained by importing a URL of a web page of real estate information, the third content obtained by importing a URL of a web page of a Starcraft community, and the fourth content obtained by importing an on-line game application Cart Rider.

Likewise, according to the current exemplary embodiment, UPnP can be extended to almost all network accessible entities by being free from the concept of UPnP device or UPnP content suggested in UPnP and presenting entities, such as an RFID card, a web browser link, and a coupon number, as UPnP devices or UPnP content. In other words, only if a user inserts an RFID card into an RFID reader, clicks a link of a web browser, or inputs a coupon number taken away from a magazine, such an entity is presented as a UPnP device or UPnP content, and therefore, the entity is automatically connected to other devices in a network according to UPnP without user's setting, thereby processing various works.

Figure 14:
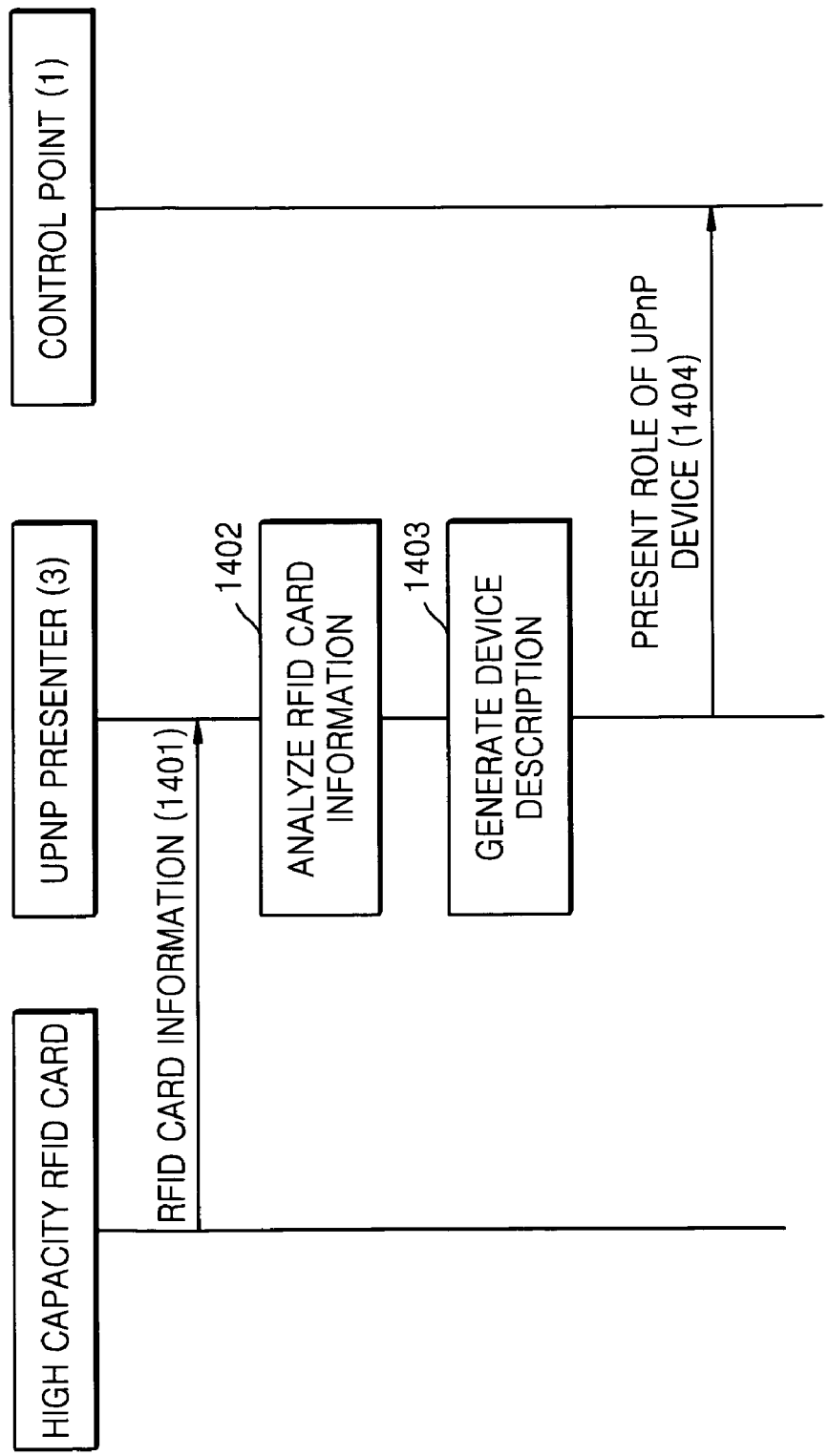
FIG. 14 is a flowchart of a method of presenting a high capacity RFID card as a UPnP device according to an exemplary embodiment of the present invention.

FIG. 14 is a flowchart of a method of presenting a high capacity RFID card as a UPnP device according to an exemplary embodiment of the present invention.

Referring to FIG. 14, the method of presenting a high capacity RFID card as a UPnP device comprises operations described below. The method of presenting a high capacity RFID card as a UPnP device comprises operations processed in time series by the UPnP presenter 3 illustrated in FIG. 3. Thus, the above description about the UPnP presenter 3 illustrated in FIG. 3 is the same in the case of the method of presenting a high capacity RFID card as a UPnP device even if some parts thereof are omitted below.

In operation 1401, when a user holds an RFID card within a certain distance of an RFID reader, the UPnP presenter 3 receives information on an entity which does not support UPnP to be presented as a UPnP device through the RFID reader.

In operation 1402, the UPnP presenter 3 analyzes the received information in operation 1401. For example, the UPnP presenter 3 can recognize that the entity which does not support UPnP is a high capacity RFID card by obtaining the type of the entity from a value of an application area field of the header part of the information illustrated in FIG. 4.

In operation 1403, the UPnP presenter 3 generates a device description describing the information on the entity which does not support UPnP in a format according to UPnP using the information analyzed in operation 1402.

In operation 1404, the UPnP presenter 3 presents a role of a UPnP device for the control point 1, which can recognize only UPnP devices among arbitrary devices, based on the device description generated in operation 1403.

Figure 15:
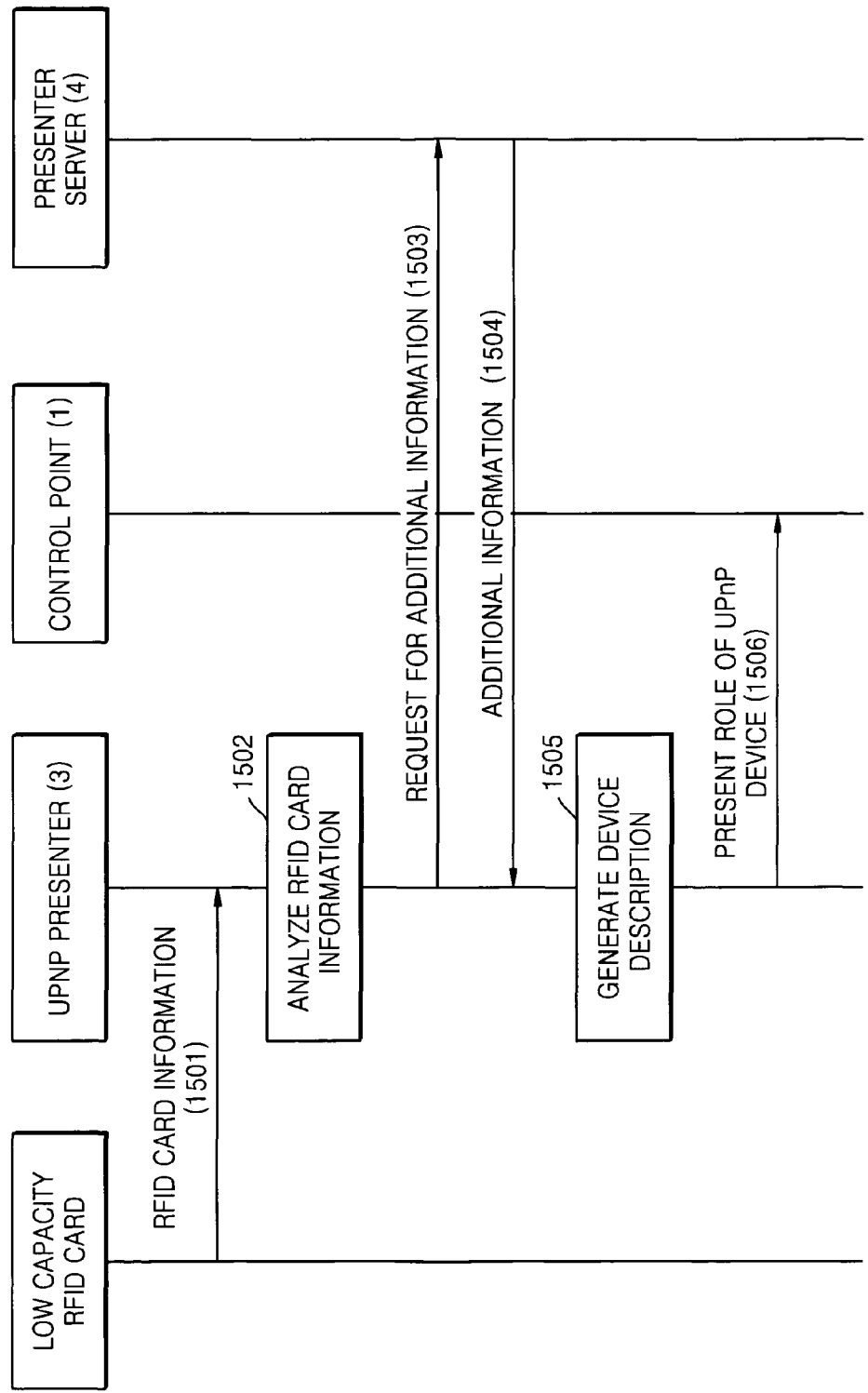
FIG. 15 is a flowchart of a method of presenting a low capacity RFID card as a UPnP device according to an exemplary embodiment of the present invention.

FIG. 15 is a flowchart of a method of presenting a low capacity RFID card as a UPnP device according to an exemplary embodiment of the present invention.

Referring to FIG. 15, the method of presenting a low capacity RFID card as a UPnP device comprises operations described below, which are processed in time series by the UPnP presenter 3 illustrated in FIG. 3. Thus, the above description about the UPnP presenter 3 illustrated in FIG. 3 is the same in the case of the method of presenting a low capacity RFID card as a UPnP device even if some of the parts thereof are omitted below.

In operation 1501, when a user holds an RFID card within a certain distance of an RFID reader, the UPnP presenter 3 receives information on an entity which does not support UPnP to be presented as a UPnP device through the RFID reader.

In operation 1502, the UPnP presenter 3 analyzes the information received in operation 1501. For example, the UPnP presenter 3 can recognize that a type of the entity which does not support UPnP is a low capacity RFID card by obtaining the type of the entity which does not support UPnP from a value of an application area field of the header part of the information illustrated in FIG. 6.

In operation 1503, the UPnP presenter 3 requests the presenter server 4 for additional information using a URL value of the presenter server 4 from the result analyzed in operation 1502 since this is a case where the additional information, i.e., the information on the content table part, is required as the result analyzed in operation 1502.

In operation 1504, the UPnP presenter 3 receives the additional information transmitted in response to the request of operation 1503.

In operation 1505, the UPnP presenter 3 generates a device description describing the information on the entity which does not support UPnP in a format according to UPnP using the information analyzed in operation 1502 and the information received in operation 1504.

In operation 1506, the UPnP presenter 3 presents a role of a UPnP device for the control point 1, which can recognize only UPnP devices among arbitrary devices, based on the device description generated in operation 1505.

Figure 16:
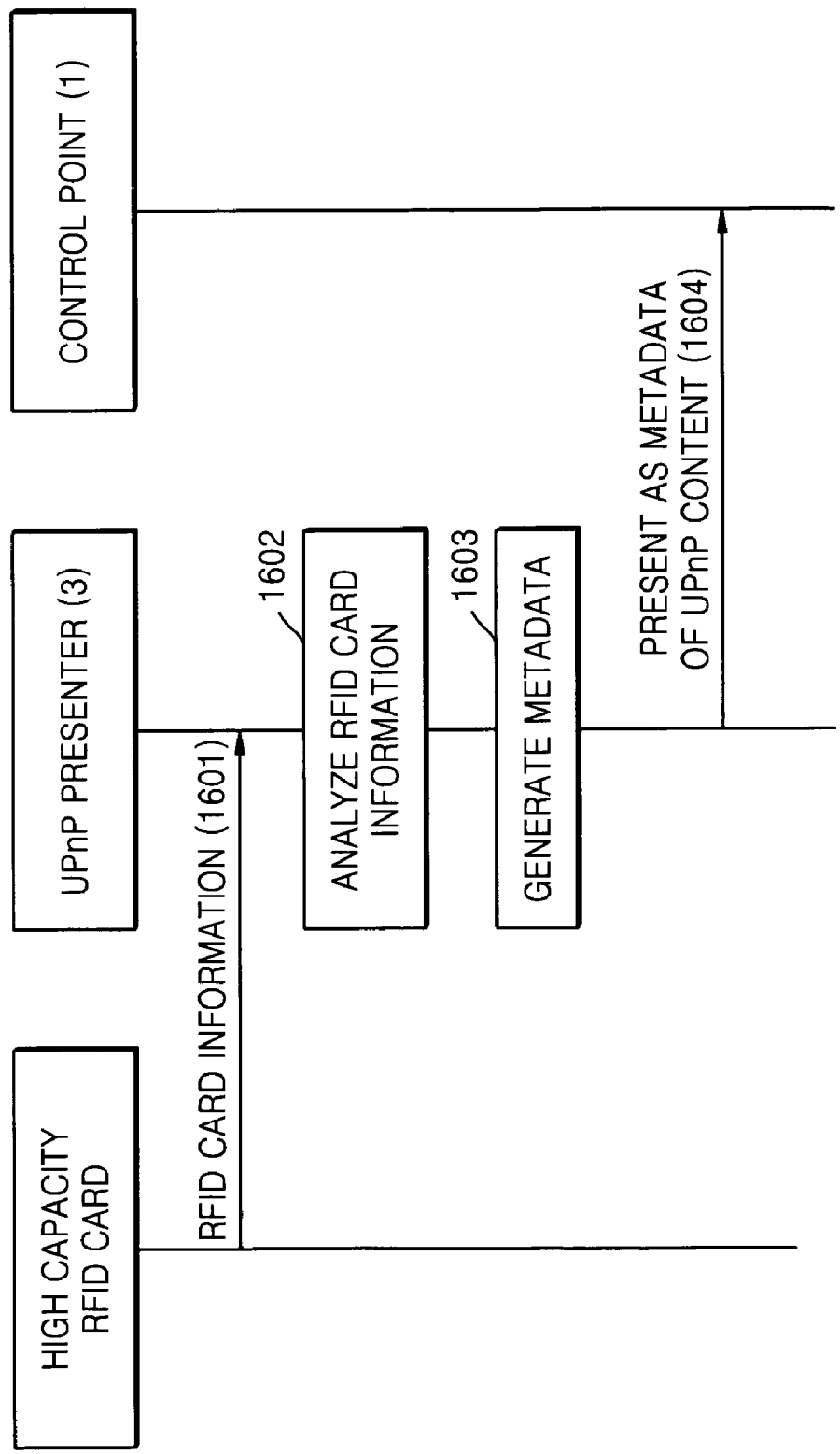
FIG. 16 is a flowchart of a method of presenting a high capacity RFID card as UPnP content according to an exemplary embodiment of the present invention.

FIG. 16 is a flowchart of a method of presenting a high capacity RFID card as UPnP content according to an exemplary embodiment of the present invention.

Referring to FIG. 16, the method of presenting a high capacity RFID card as UPnP content comprises operations described below, which are processed in time series by the UPnP presenter 3 illustrated in FIG. 9. Thus, the above description about the UPnP presenter 3 illustrated in FIG. 9 is the same in the case of the method of presenting a high capacity RFID card as UPnP content even if some of the parts thereof are omitted below.

In operation 1601, when a user holds an RFID card within a certain distance of an RFID reader, the UPnP presenter 3 receives information on an entity which does not support UPnP to be presented as UPnP content through the RFID reader.

In operation 1602, the UPnP presenter 3 analyzes the information received in operation 1601. For example, the UPnP presenter 3 can recognize that the entity which does not support UPnP is a high capacity RFID card by obtaining the type of the entity from a value of an application area field of the header part of the information illustrated in FIG. 10.

In operation 1603, the UPnP presenter 3 generates metadata describing the information on the entity which does not support UPnP in a format according to UPnP using the information analyzed in operation 1602.

In operation 1604, the UPnP presenter 3 presents the metadata generated in operation 1603 as metadata of UPnP content for the control point 1, which can recognize only UPnP content among arbitrary content.

FIG. 17 is a flowchart of a method of presenting a low capacity RFID card as UPnP content according to an exemplary embodiment of the present invention.

Referring to FIG. 17, the method of presenting a low capacity RFID card as UPnP content comprises operations described below, which are processed in time series by the UPnP presenter 3 illustrated in FIG. 9. Thus, the above description about the UPnP presenter 3 illustrated in FIG. 9 is the same in the case of the method of presenting a low capacity RFID card as UPnP content even if some part thereof are omitted below.

In operation 1701, when a user holds an RFID card within a certain distance of an RFID reader, the UPnP presenter 3 receives information on an entity which does not support UPnP to be presented as UPnP content through the RFID reader.

In operation 1702, the UPnP presenter 3 analyzes the information received in operation 1701. For example, the UPnP presenter 3 can recognize that the entity which does not support UPnP is a low capacity RFID card by obtaining the type of the entity from a value of an application area field of the header part of the information illustrated in FIG. 11.

In operation 1703, the UPnP presenter 3 requests the presenter server 4 for additional information using a URL value of the presenter server 4 from the result analyzed in operation 1702 since this is a case where the additional information, i.e., the information on the content table part, is required as the result analyzed in operation 1702.

In operation 1704, the UPnP presenter 3 receives the additional information transmitted in response to the request of operation 1703.

In operation 1705, the UPnP presenter 3 generates metadata describing the information on the entity which does not support UPnP in a format according to UPnP using the information analyzed in operation 1702 and the information received in operation 1704.

In operation 1706, the UPnP presenter 3 presents the metadata generated in operation 1705 as metadata of UPnP content for the control point 1, which can recognize only UPnP content among arbitrary content.

FIG. 18 is a flowchart of a method of presenting an external application as a UPnP device according to an exemplary embodiment of the present invention.

Referring to FIG. 18, the method of presenting an external application as a UPnP device comprises operations described below, which are processed in time series by the UPnP presenter 3 illustrated in FIG. 3. Thus, the above description about the UPnP presenter 3 illustrated in FIG. 3 is the same in the case of the method of presenting an external application as a UPnP device even if some parts thereof are omitted below.

In operation 1801, an external application transmits information on an entity which does not support UPnP to be presented as a UPnP device via network by calling an ExportDevice action of the UPnP service provided by the UPnP presenter service module 311 of the UPnP presenter 3. In particular, if the information on an entity which does not support UPnP is received via the network, additional information is not required in general because the storage capacity is not limited differently from the case of the low capacity RFID card.

In operation 1802, the UPnP presenter 3 analyzes the information received in operation 1801. For example, the UPnP presenter 3 can recognize that the entity which does not support UPnP is an external application by obtaining the type of the entity from the value of the application area field of the header part of the information illustrated in FIG. 4.

In operation 1803, the UPnP presenter 3 generates a device description describing the information on the entity which does not support UPnP in a format according to UPnP using the information analyzed in operation 1802.

In operation 1804, the UPnP presenter 3 presents a role of a UPnP device for the control point 1, which can recognize only UPnP devices among arbitrary devices, based on the device description generated in operation 1803.

FIG. 19 is a flowchart of a method of presenting an external application as UPnP content according to an exemplary embodiment of the present invention.

Referring to FIG. 19, the method of presenting an external application as UPnP content comprises operations described below, which are processed in time series by the UPnP presenter 3 illustrated in FIG. 9. Thus, the above description about the UPnP presenter 3 illustrated in FIG. 9 is the same in the case of the method of presenting an external application as UPnP content even if some parts thereof are omitted below.

In operation 1901, an external application transmits information on an entity which does not support UPnP to be presented as UPnP content via a network by calling an ExportContent action of the UPnP service provided by the UPnP presenter service module 311 of the UPnP presenter 3. In particular, if the information on an entity which does not support UPnP is received via the network, additional information is not required in general because the limitation of storage capacity as in a low capacity RFID card does not exist.

In operation 1902, the UPnP presenter 3 analyzes the information received in operation 1901. For example, the UPnP presenter 3 can recognize that the entity which does not support UPnP is an external application by obtaining the type of the entity from the value of the application area field of the header part of the information illustrated in FIG. 10.

In operation 1903, the UPnP presenter 3 generates metadata describing the information on the entity which does not support UPnP in a format according to UPnP using the information analyzed in operation 1902.

In operation 1904, the UPnP presenter 3 presents the metadata generated in operation U 1903 as metadata of UPnP content for the control point 1, which can recognize only UPnP content among arbitrary content.

The exemplary embodiments of the present invention can be written as computer programs and can be implemented in general-use digital computers that execute the programs using a computer readable recording medium. Examples of the computer readable recording medium include magnetic storage media (e.g., ROMs, floppy disks, hard disks, etc.), and optical recording media (e.g., CD-ROMs, or DVDs).

As described above, according to exemplary embodiments of the present invention, by presenting an entity which does not support UPnP as a device or content supporting UPnP, there can be excluded the stereotype that a UPnP device is a physical device, such as a media server or a digital TV, and that UPnP content is AV content such as media content, and therefore, UPnP can be applied to various entities such as an RFID card, a pack, a coupon number, a hot code, a barcode, a URL, and text XML binary information.

Furthermore, a scenario much richer than a related art scenario can be provided through the variety according to the application of UPnP to the various entities. Accordingly, the convenience of using various entities in a network increases, which can help producers or providers increase their profits. That is, users can easily access various entities via a network, and producers or providers of the various entities can easily provide the various entities to homes, and thus more business opportunities can occur.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A method of presenting an entity which does not support a standard as a device supporting the standard, the method comprising:
   generating a device description describing information on the entity in a format according to the standard; and
   presenting a role of the device supporting the standard for a control point, which can recognize only devices supporting the standard, based on the generated device description,
   wherein the information is input by the entity, and the generating of the device description comprises generating the device description using the input information if it is determined based on the input information that the entity has sufficient storage capacity to generate the device description, and the device description is generated using at least one of generating the device description using both the input information and additional information received from an external device if it is determined based on the input information that the entity does not have sufficient storage capacity to generate the device description;
   wherein the standard is Universal Plug and Play (UPnP).

2. The method of claim 1, wherein, in the presenting, the control point is notified that the device description is generated, and a role of a device supporting the standard is presented by exporting the device description in response to a request of the control point, which is notified.

3. The method of claim 2, wherein, in the presenting, a role of a device supporting the standard is presented by performing a response operation in response to a control operation performed by the control point, which has obtained the device description.

4. The method of claim 1, further comprising:
   obtaining the information on the entity via the network by using a service controlling a device in the network, which has the information on the entity, wherein, in the generating, the device description is generated using the obtained information.

5. The method of claim 1, further comprising: obtaining the information through a device reading data from the entity, wherein, in the generating, the device description is generated using the obtained information.

6. An apparatus for presenting an entity which does not support a standard as a device supporting the standard, the apparatus comprising:
   a generation unit which generates a device description describing information on the entity in a format according to the standard; and
   a presenter which presents a role of the device supporting the standard for a control point, which can recognize only devices supporting the standard, based on the generated device description,
   wherein the information is input by the entity, and the generation unit generates the device description using the input information if it is determined based on the input information that the entity has sufficient storage capacity to generate the device description, and generates the device description using both the input information and additional information received from an external device if it is determined based on the input information that the entity does not have sufficient storage capacity to generate the device description;
   wherein the standard is Universal Plug and Play (UPnP).

7. A computer readable recording medium storing a computer readable program for executing a method of presenting an entity which does not support a standard as a device supporting the standard, the method comprising:
   generating a device description describing information on the entity in a format according to the standard; and
   presenting a role of the device supporting the standard for a control point, which can recognize only devices supporting the standard, based on the generated device description,
   wherein the information is input by the entity, and the generating of the device description comprises generating the device description using the input information if it is determined based on the input information that the entity has sufficient storage capacity to generate the device description, and generating the device description using both input information and additional information received from an external device if it is determined based on the input information that the entity does not have sufficient storage capacity to generate the device description;
   wherein the standard is Universal Plug and Play (UPnP).

8. A method of presenting an entity which does not support a standard as content supporting the standard, the method comprising:

generating metadata describing information on the entity in a format according to the standard; and presenting the generated metadata as metadata of the content supporting the standard for a control point, which can recognize only content supporting the standard, wherein the information is input by the entity, and the generating of the metadata comprises generating the metadata using the input information if it is determined based on the input information that the entity has sufficient storage capacity to generate the metadata, and generating the metadata using both the input information and additional information received from an external device if it is determined based on the input information that the entity does not have sufficient storage capacity to generate the metadata;

wherein the standard is Universal Plug and Play (UPnP).

9. The method of claim 8, wherein, in the presenting, the control point is notified that the metadata is generated, and the entity is presented as the content supporting the standard by exporting the metadata in response to a request of the control point, which is notified.

10. The method of claim 8, wherein, in the presenting, the entity is presented as the content supporting the standard by exporting the metadata using a content directory service of a media server.

11. An apparatus for presenting an entity which does not support a standard as content supporting the standard, the apparatus comprising:

a generation unit which generates metadata describing information on the entity in a format according to the standard; and a presenter which presents the metadata generated by the generation unit as metadata of the content supporting the standard for a control point, which can recognize only content supporting the standard, wherein the information is input by the entity, and the generation unit generates the metadata using the input information if it is determined based on the input information that the entity has sufficient storage capacity to generate the metadata, and generates the metadata using both the input information and additional information received from an external device if it is determined based on the input information that the entity does not have sufficient storage capacity to generate the metadata;

wherein the standard is Universal Plug and Play (UPnP).

12. A computer readable recording medium storing a computer readable program for executing a method of presenting an entity which does not support a standard as content supporting the standard, the method comprising:

generating metadata describing information on the entity in a format according to the standard; and presenting the generated metadata as metadata of the content supporting the standard for a control point, which can recognize only content supporting the standard, wherein the information is input by the entity, and the generating of the metadata comprises generating the metadata using the input information if it is determined based on the input information that the entity has sufficient storage capacity to generate the metadata, and generating the metadata using both the input information and additional information received from an external device if it is determined based on the input information that the entity does not have sufficient storage capacity to generate the metadata;

wherein the standard is Universal Plug and Play (UPnP).

13. The method of claim 1, wherein the information on the entity is information which is stored on the entity.

14. The method of claim 1, wherein the entity is a storage medium which stores the information.

15. The method of claim 1, further comprising:

receiving the information on the entity in response to the information being accessed.

16. The method of claim 15, wherein the information on the entity is received only in response to the information being accessed.

17. The method of claim 1, wherein the entity is a non-physical entity.

18. The apparatus of claim 6, wherein the entity is a non-physical entity.

19. The computer readable recording medium of claim 7, wherein the entity is a non-physical entity.

20. The method of claim 8, wherein the entity is a non-physical entity.

21. The apparatus of claim 11, wherein the entity is a non-physical entity.

22. The computer readable recording medium of claim 12, wherein the entity is a non-physical entity.

\* \* \* \* \*